Nov. 4, 1952     E. SCHMITZ ET AL     2,616,163
METHOD OF CONSTRUCTING OPEN-TOP
ENAMEL-LINED CYLINDRICAL TANKS
Filed March 12, 1948
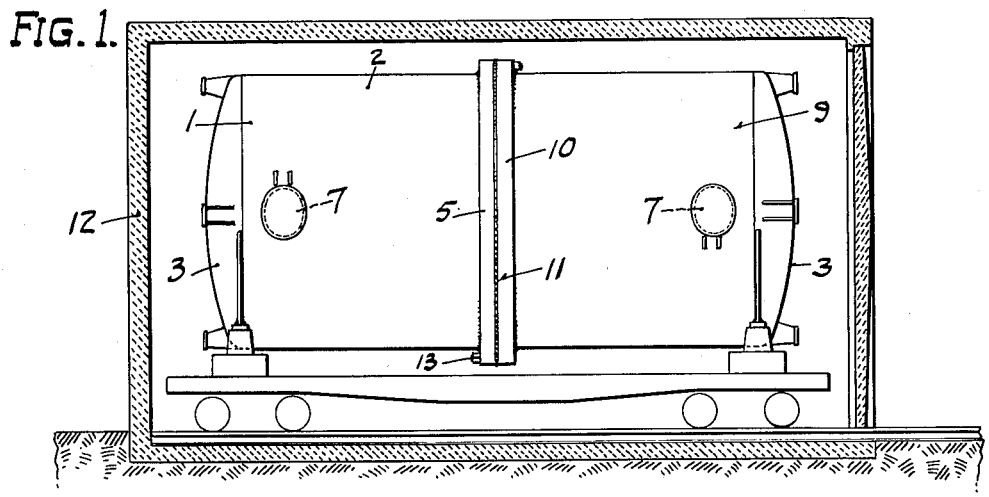
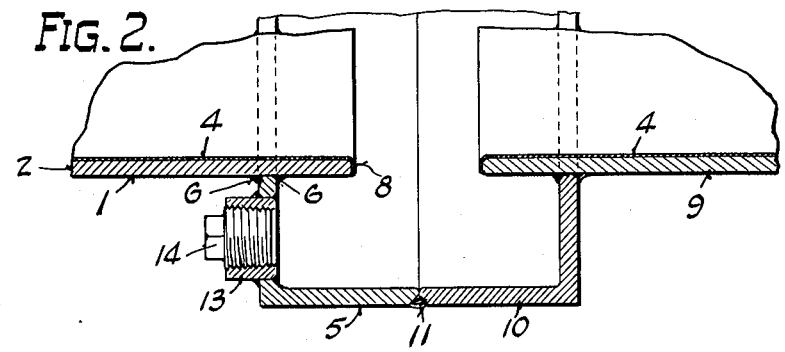
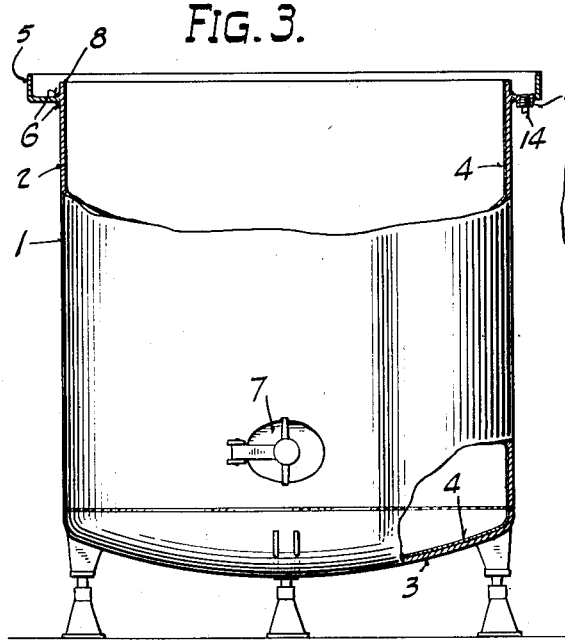
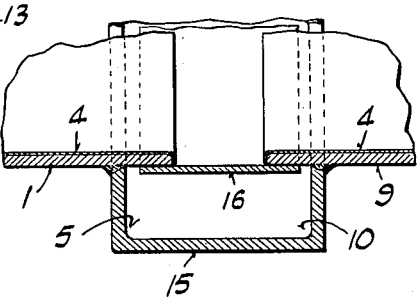
Raymond C. Weber
Ewald Schmitz
INVENTORS
BY Andrus & Sceales
ATTORNEYS.

Patented Nov. 4, 1952

2,616,163

UNITED STATES PATENT OFFICE 2,616,163

METHOD OF CONSTRUCTING OPEN-TOP ENAMEL-LINED CYLINDRICAL TANKS

Ewald Schmitz and Raymond C. Weber, Milwaukee, Wis., assignors to A. O. Smith Corporation, Milwaukee, Wis., a corporation of New York Application March 12, 1948, Serial No. 14,418

2 Claims. (Cl. 29—148.2)

This invention relates to a method of constructing open top enamel lined cylindrical tanks and has particular relation to providing a trough structure circumferentially of the upper edge of the tank and utilizing the trough structure in the enameling of the tank.

Difficulty has been experienced heretofore in lining an open top tank or vessel of substantial diameter and generally thin wall with ceramic or vitreous enamel since in the firing of the enamel the problem of supporting the tank is presented to prevent any deformation or distortion of the wall of the tank during heating and cooling with consequent injury to the enamel lining.

The principal object of the present invention is to provide a method of constructing enamel-lined metal vessels of substantial diameter and thin wall which are open at the top, without injury to the enamel.

Another object of the invention is to provide a less expensive method of fabricating enamel-lined open top vertical tanks.

A further object is to provide an open top enamel-lined vertical tank with means to trap products of fermentation.

Another object is to provide an open top vertical tank of generally large diameter and thin wall with a trough at the top to catch waste products and to stiffen and strengthen the upper end of the tank wall.

Another object is to provide an improved method of supporting an open top vertical tank during firing of the enamel lining thereto to prevent injury to the enamel.

A further object is to provide a method of lining open top vertical tanks to keep dust and foreign matter from contacting the enamel during firing.

Another object is to provide a method of constructing enamel-lined open top vertical tanks which makes it possible to fire the tank in a direct fire furnace with the tank serving as a muffle to control the atmosphere inside the tank during the firing of the enamel.

Another object is to provide a method of providing the enamel lining of a pair of tanks in a single firing operation.

These and other objects of the invention will appear hereinafter in connection with the following description of the drawing illustrating several embodiments of the invention:

Figure 1 is an elevational view of a pair of tanks assembled in accordance with the invention and disposed in an enameling furnace for firing of the enamel lining;

Figure 2 is an enlarged detailed sectional view of a portion of the tanks of Figure 1;

Fig. 3 is an elevational view with parts broken away and sectioned to show a tank completed in accordance with the invention; and Fig. 4 is a view similar to Fig. 2 illustrating another method of carrying out the invention.

Referring to Fig. 3 of the drawing, there is shown a vertical tank or vessel 1 completed in accordance with the invention and comprising the generally cylindrical shell 2 open at the top and closed at the bottom by the head 3 which is engaged by suitable supports. The inside of shell 2 and head 3 are provided with a lining 4 of ceramic or vitreous enamel to protect the metal of the shell and head from corrosion by contained fluids or liquids.

An annular flange 5 which is shown as being of a generally L-shape is joined to the outside of shell 2 of the tank slightly below the upper end thereof by the circumferential welds 6 to provide a trough extending around the circumference of the tank to catch products of fermentation and the like which spill over the upper edge of shell 2. The thickness of the metal of the annular flange 5 is about the same as that of the shell 2, as best seen in Figs. 2, 3 and 4. This uniformity of section of the metal provides for equal expansion and contraction of the metal during firing and cooling of the enamel lining.

The flanged trough 5 extends axially beyond the end of shell 2 a substantial distance to insure that the fermentation products will be entrapped and to provide clearance of the shell end to carry out the method of the invention, which will be described.

The manhole 7 is provided in shell 2 with a suitable closure therefore so that access to the inside of the tank may be gained.

In carrying out the method of the invention, it has been found that numerous problems in making an enameled open top thin wall tank of generally large diameter can be overcome by enameling and firing two tanks at one time, as will be described.

Under this method shell 2 of tank 1, which is shown in Fig. 3 and also as the tank to the left in Figure 1, is prepared for enameling by rounding off the upper inner end 8 thereof to remove the sharp corner on the inside of the shell. The head 3 is welded to the lower end of shell 2 to close off the same and flanged trough 5 is joined at the inner end to the outside of shell 2 by circumferential welds 6 slightly below end 8. If supports are to be attached to head 3 they are welded thereto at the time trough 5 is joined to the shell or at least before any enameling is done.

It will be noted that the welding of any supports to head 3, or of the trough 5 to the shell 2, prior to enameling the inner surface of the shell, will eliminate the danger of crazing the enamel caused by the heat from welding.

A tank 9, which corresponds to tank 1 and which is illustrated in the drawing at the right in Figure 1, is fabricated and welded together the same as tank 1 and provided with a trough 10 which corresponds to trough 5 of tank 1.

Trough 5 of tank 1 is next joined to trough 10 of tank 9 by circumferential weld 11 to seal tanks 1 and 9 together, as shown in Figs. 1 and 2. The tanks are then annealed and sandblasted to prepare the same for enameling.

The inside of tanks or vessels 1 and 9 are next sprayed with enamel slip. The inside surface of troughs 5 and 10 is merely coated with a dust coat of slip to keep the metal of the troughs from scaling during firing. The spraying of the enamel slip on the inside of the tanks, as well as any of the other operations on the inside of the tanks, is accomplished by working through manhole 7.

After the spraying is completed, the tanks 1 and 9 are fired in furnace 12 in a horizontal position, as shown in Figure 1, at temperatures approximating 1600° F. to fuse the enamel to the steel and provide the enamel lining 4. Manholes 7 are temporarily sealed off during the firing of the tanks and sufficient internal pressure is maintained on the inside of the tanks during the firing to prevent deformation. The tanks are supported in furnace 12 on their heads leaving the thinner shells of the tanks free to expand and contract.

The welding of the troughs of tanks 1 and 9 together, as described, provides a unitary structure which makes it possible to accomplish support of the structure on the heads during the fusing of the enamel to the respective tanks. In addition, the tanks can be fired in a direct fired furnace rather than requiring a furnace in which the atmosphere is controlled, since the gases inside the tanks are inert as the inside of the tanks is sealed off from the atmosphere during the firing operation.

After firing, the tanks 1 and 9 are removed from the furnace and allowed to cool. The application of another coat of enamel and a second firing operation may also be carried out. The tanks are then cut apart or otherwise separated at circumferential weld 11 which joins troughs 5 and 10 together, to provide two separate open top vertical tanks, as illustrated by the tank in Fig. 3.

The troughs serve to catch products of fermentation, such as foam if the vessel is used in beer fermentation, and may be painted on the inside to protect them from corrosion. The troughs are provided, as shown in Figs. 2 and 3 as respects trough 5, with an outlet for drainage which comprises a spud 13 welded into the bottom of the trough and a removable plug 14 secured therein. The products of fermentation may be piped off from the trough if desired.

Under another embodiment of the invention, as illustrated in Fig. 4, the channel member 15 is welded to the outside of tanks 1 and 9 adjacent their open ends to join the tanks together during the firing operation to fuse the enamel lining 4 in place. Thereafter the channel is cut circumferentially in the center to separate the tanks and provide trough 5 on vessel 1 and trough 10 on vessel 9. This method eliminates initially joining the troughs together by circumferential weld 11. In this embodiment a non-corrosive easily removable metal band 16 is disposed across the joint between the tanks to prevent foreign material from the troughs in firing from getting into the tanks.

The invention provides a method of making open top enamel-lined vertical tanks of relatively large diameter and thin wall wherein it is possible to support each tank at its thicker head portion during firing leaving the thinner shell walls free. Also, the tanks may be fired in a direct fire furnace since the securing of the tanks together makes the structure operate as a muffle and the coating on the inside of the tanks is not exposed to the air during firing. Costs of production are decreased by enameling and firing two tanks in a single operation and especially where two coats of enamel are fired into place.

The providing of the troughs on the tanks makes it feasible to carry out the method of the invention. The troughs rather than the tanks are cut apart and no injury to the enamel coating of the shells occurs in this operation. Also, the troughs permit two tanks to be fired at one time and provide for the sealing off of the tanks during firing.

Various embodiments of the invention may be employed within the scope of the accompanying claims.

We claim:

1. A method of fabricating an open top enamel-lined vertical cylindrical tank of relatively large diameter and thin wall and having a circumferential upwardly facing trough external to the open end thereof, comprising constructing an open and cylindrical tank, welding to the outer circumference of the wall of the tank a trough structure having a flange portion extending outwardly from the tank wall and spaced a short distance from the end edge of the tank and having a generally cylindrical wall portion of larger diameter than the diameter of the tank and spaced radially therefrom with said wall portion extending from said flange portion longitudinally of the tank beyond the end edge of the tank wall and having an end closure for the open end of the tank leaving said edge free and in non-contacting relation with respect to said trough structure and end closure, applying enamel slip to the inside of the tank and over said free end edge thereof, fusing and bonding the slip to the tank by firing the same in a furnace while maintaining the inside of the tank substantially closed off from the atmosphere in the furnace, supporting the tank horizontally during said firing step at the end head of the tank and at said closure, and thereafter severing said closure from the cylindrical portion of said trough structure at a circumferential line in said cylindrical portion in a plane longitudinally removed outwardly of said free edge of the tank to prevent injury to the enamel lining and provide the tank with an upstanding trough to entrap waste products spilled over the upper end of the tank in service.

2. The method of claim 1 in which the end closure member is a second tank similarly constructed with an open end facing the open end of the first named tank and the tanks are joined with their corresponding free end edges spaced axially apart by the larger diameter cylindrical wall portion of a common trough structure, and in which the final step severs the cylindrical wall portion of said trough structure to provide two separate tanks each with a trough extending circumferentially of the open end edge thereof.

EWALD SCHMITZ.
RAYMOND C. WEBER.

REFERENCES CITED

The following references are of record in the file of this patent:

UNITED STATES PATENTS

| Number | Name | Date |
|---|---|---|
| 1,478,060 | Richman | Dec. 18, 1923 |
| 1,534,448 | Hauser | Apr. 21, 1925 |
| 1,871,449 | Eschholz | Aug. 16, 1932 |
| 2,007,678 | Fischer | July 9, 1935 |
| 2,123,169 | Fowler | July 12, 1938 |
| 2,281,407 | Bohnsack | Apr. 28, 1942 |
| 2,335,153 | Lauck | Nov. 23, 1943 |
| 2,335,174 | Crawford | Nov. 23, 1943 |
| 2,386,246 | Mapes | Oct. 9, 1945 |
| 2,409,966 | Voity | Oct. 22, 1946 |
| 2,444,833 | Lampert | July 6, 1948 |